(12) United States Patent
de Dinechin et al.

(10) Patent No.: US 8,505,020 B2
(45) Date of Patent: Aug. 6, 2013

(54) COMPUTER WORKLOAD MIGRATION USING PROCESSOR POOLING

(75) Inventors: Christophe de Dinechin, Valbonne (FR); Dale C. Morris, Steamboat Springs, CO (US); Patrick Knebel, Fort Collins, CO (US); Russ W. Herrell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 12/870,835

(22) Filed: Aug. 29, 2010

(65) Prior Publication Data

US 2012/0054766 A1 Mar. 1, 2012

(51) Int. Cl.
*G06F 9/46* (2006.01)
*G06F 15/173* (2006.01)
*G06F 1/00* (2006.01)
*G06F 11/00* (2006.01)

(52) U.S. Cl.
USPC ........... 718/104; 718/105; 709/225; 709/226; 713/320; 713/324; 714/4.11; 714/4.12

(58) Field of Classification Search
USPC ..... 718/1–105; 713/300–340; 709/223–226; 714/1, 2, 4.1–4.12
See application file for complete search history.

(56) References Cited

U.S. PATENT DOCUMENTS

| | | | |
|---|---|---|---|
| 5,198,979 A | 3/1993 | Moorhead et al. | |
| 6,260,020 B1 | 7/2001 | Ruffin et al. | |
| 6,557,008 B1 | 4/2003 | Temple, II et al. | |
| 6,587,833 B1 | 7/2003 | Ruffin et al. | |
| 6,968,324 B1 | 11/2005 | Ruffin et al. | |
| 6,985,952 B2 | 1/2006 | Bohrer et al. | |
| 7,209,948 B2 | 4/2007 | Srinivasa | |
| 7,478,272 B2 * | 1/2009 | Armstrong et al. | 714/10 |
| 7,711,980 B1 | 5/2010 | Scarpello, Jr. et al. | |
| 7,752,239 B2 | 7/2010 | Richards et al. | |
| 7,958,392 B2 * | 6/2011 | Armstrong et al. | 714/10 |
| 8,099,615 B2 * | 1/2012 | Tripathi | 713/324 |
| 2005/0039180 A1 * | 2/2005 | Fultheim et al. | 718/1 |
| 2005/0172164 A1 * | 8/2005 | Fox et al. | 714/13 |
| 2006/0005189 A1 * | 1/2006 | Vega et al. | 718/1 |
| 2006/0155912 A1 * | 7/2006 | Singh et al. | 711/6 |
| 2006/0282762 A1 | 12/2006 | Diamond et al. | |
| 2007/0240143 A1 * | 10/2007 | Guminy et al. | 717/168 |
| 2007/0244962 A1 * | 10/2007 | Laadan et al. | 709/201 |

(Continued)

OTHER PUBLICATIONS

Barak, Amnon, and A Shiloh, "The MOSIX Management System for Linux Clusters, Multi-Clusters and Clouds", A. Barak and A. Shiloh, www.MOSIX.org, 2009, pp. 1-10,.

(Continued)

*Primary Examiner* — Abdullah Al Kawsar (57) ABSTRACT

An event calling for a migration of a workload from a source processor set of processing units to a target processor set of processing units is detected. Processes of the workload are allocated to a second processor set of processing units so that some workload processes are executed on the source processor set and some workload processes are executed on a second processor set of processor units. Then, some workload processes are allocated to the second processor set so that no workload process is executing on the source processor set and at least some of said processes are executing on the second process set. The second processor set can be the target processor set or an intermediate processor set from which the workload is migrated to the target processor set.

14 Claims, 5 Drawing Sheets

U.S. PATENT DOCUMENTS

| | | | |
|---|---|---|---|
| 2007/0250838 A1* | 10/2007 | Belady et al. | 718/105 |
| 2008/0046960 A1 | 2/2008 | Bade et al. | |
| 2008/0077366 A1 | 3/2008 | Neuse et al. | |
| 2009/0037162 A1 | 2/2009 | Gaither et al. | |
| 2010/0042673 A1 | 2/2010 | Dayley | |
| 2010/0287548 A1* | 11/2010 | Zhou et al. | 718/1 |
| 2010/0287560 A1* | 11/2010 | Neft | 718/104 |
| 2012/0042034 A1* | 2/2012 | Goggin et al. | 709/216 |

OTHER PUBLICATIONS

Barak, Amnon, "Overview of MOSIX", A. Barak, www.MOSIX.org, 2010, pp. 1-33.

Hansen, Jacob Gorm, "Virtual Machine Mobility With Self-Migration", Ph.D. Thesis, Department of Computer Science, University of Cophenhagen, Apr. 7, 2009, www.diku.dk/hjemmesider/ansatte/jacobg/thesis.pdf, 148 pages, see pp. 114-124.

\* cited by examiner

COMPUTER WORKLOAD MIGRATION USING PROCESSOR POOLING

BACKGROUND

Computer workloads are migrated from one computer to another for several reasons. The target computer may be a better match for the workload or the source computer may be a better match for another workload. It may be desirable to clear the source computer of workloads for repair, for upgrading, or for saving power by shut down.

In one approach, a workload is run in a virtual machine. The virtual machine is frozen. The disk image of the frozen virtual machine is copied from a source computer to a target computer. The virtual machine is restarted, completing the migration process.

DETAILED DESCRIPTION

Figure 1:
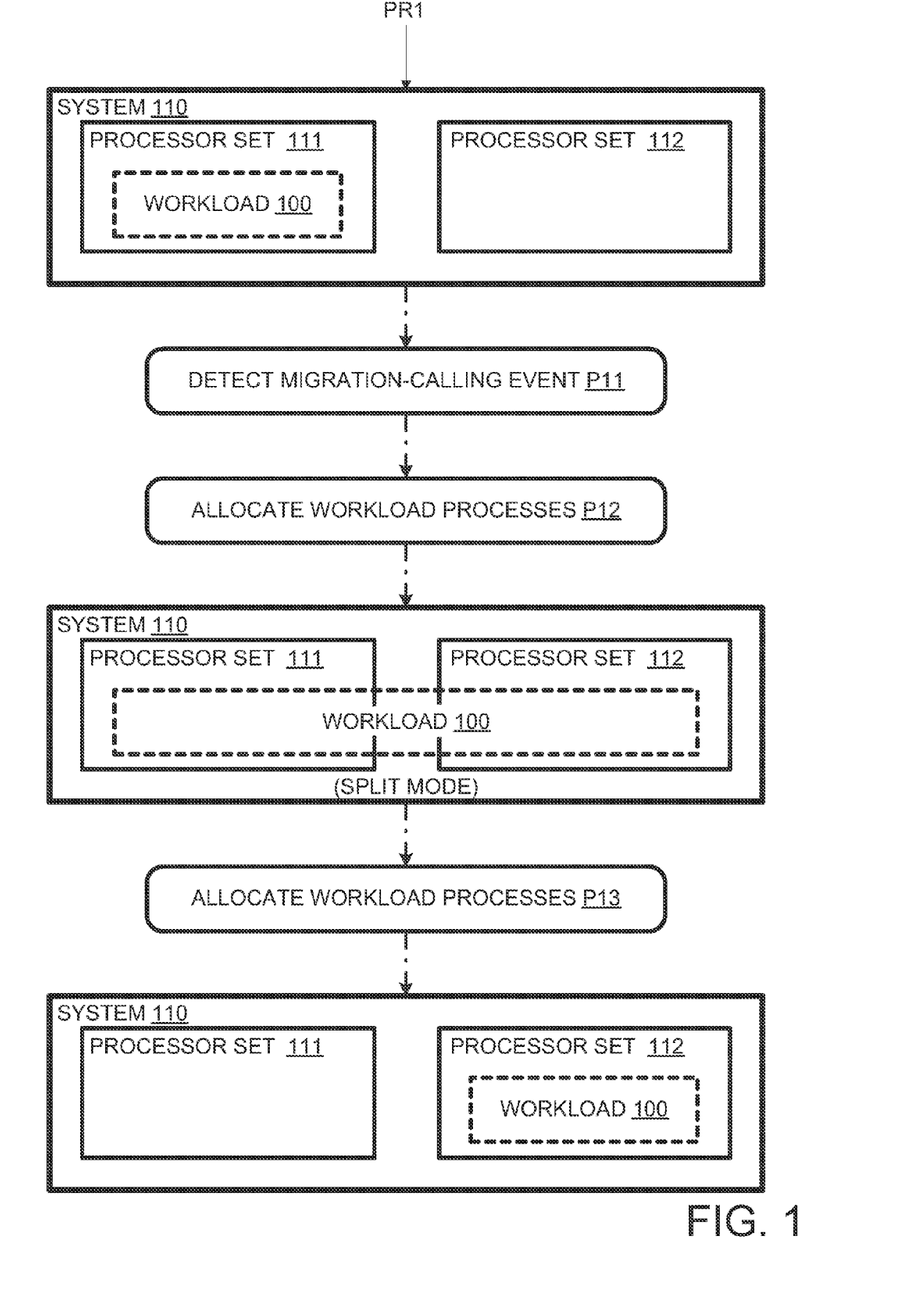
FIG. 1 is a flow diagram of a process in accordance with an embodiment.

A process PR1, depicted in FIG. 1, provides for migrating a computer workload 100 between processor sets of a system 110. The migration is in response to detection, at process segment P11, of an event calling for a migration from a source processor set 111 of processor units to a target processor set of processor units. At process segment P12, some processes of workload 100 are allocated to a second processor set 112 so that some processes of workload 100 continue to execute on source processor set 111 while other processes of workload 100 execute on a second processor set 112. Processor set 112 may be the target processor set or an intermediate processor set, from which workload 100 will be further migrated to the target processor set. At process segment P13, processes of workload 100 are allocated to processor set 112 so that at least some processes of workload 100 are executing on processor set 112 but no processes of workload 100 are executing on source processor set 111. The distinctive intermediate split mode resulting from process segment P12 provides for migration with uninterrupted operation of workload 100 with only one workload instance as opposed to redundant and resource-costly active and standby instances.

Figure 2:
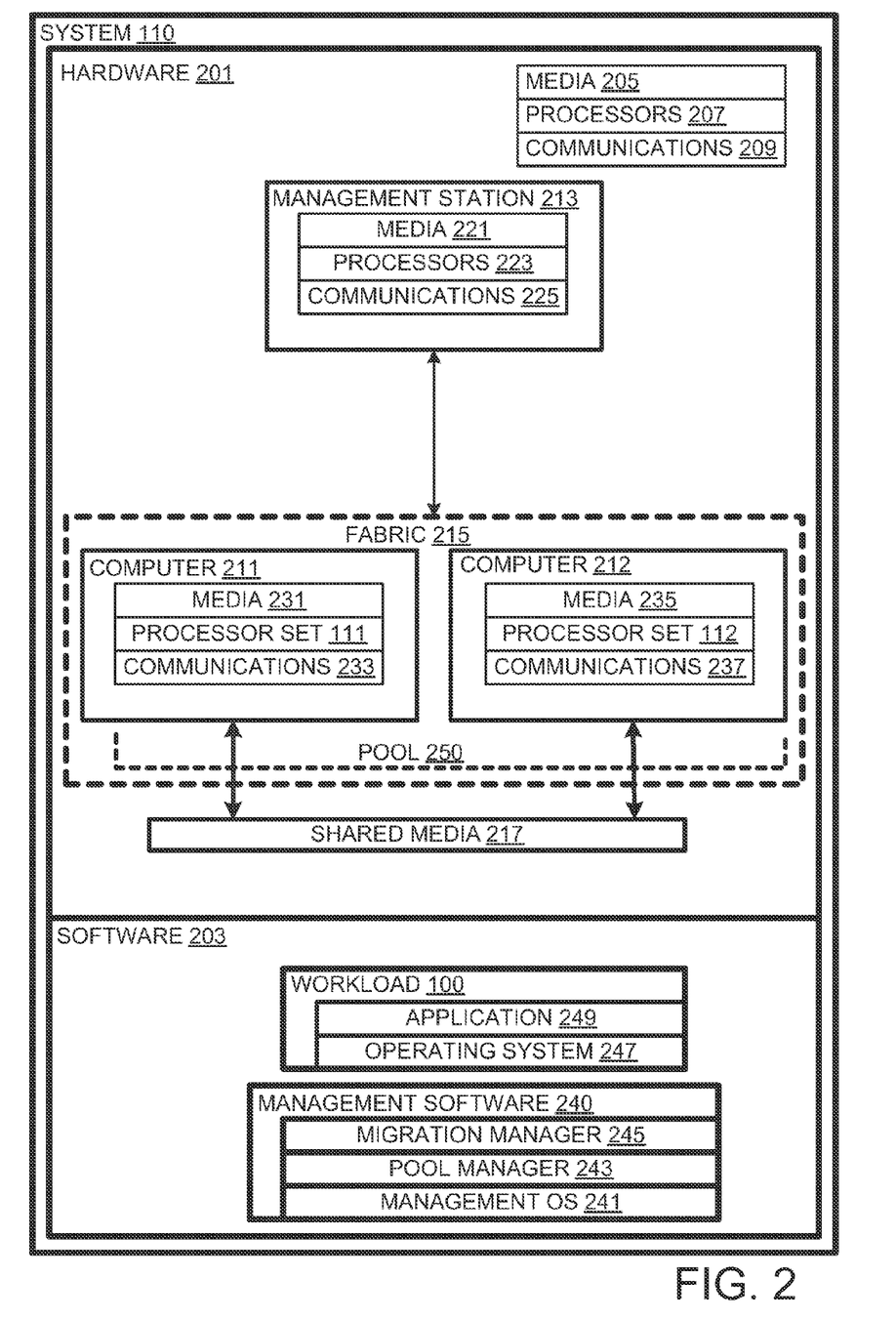
FIG. 2 is a schematic diagram of a system in which the process of FIG. 1 is implemented.

System 110 includes hardware 201 and software 203, as shown in FIG. 2. Hardware 201 includes non-transitory tangible computer-readable storage media 205, processors 207, and communications devices 209. Functionally, hardware 201 includes a management station 213, a fabric 215, and shared media 217. Management station 213 includes media 221, processors 223, and communications devices 225; fabric 215 includes computers 211 and 212 as nodes. Computer 211 includes media 231, processor set 111, and communications devices 233; and computer 212 includes media 235, processor set 112, and communications devices 237.

Software 203 includes management software 240; including a management operating system 241, a pool manager 243, and a migration manager 245. These software components run primarily on management station 213, with associated agent software running on managed computers, e.g., computers 211 and 212. Workload 100 includes an operating system 247 and an application 249. In other cases, the workload can have an operating system that hosts virtual machines running guest operating systems and respective applications.

Reconfigurable fabric 215 can be configured across computers (nodes) to allow full coherent access to memory across all processors so configured. This makes it possible to have a single operating system image across these processors. The effect is to pool processors from different computers as to allow processes of a workload to communicate across computer boundaries. Thus, fabric 215 can be reconfigured to define a pool of processors, such as pool 250 including the processors of computers 211 and 212, as shown in FIG. 2. In an alternative embodiment, system software and hardware make the pool more explicit; for example, a cluster in an OpenVMS (Open Virtual Memory System) operating system can be a processor pool. Management operating system 241, pool manager 243, and migration manager 245 are configured to control fabric 215 so that a single system image can be formed across the nodes (computers) of a pool so that it can migrate processes across the nodes. Workload 100 and workload operating system 247 need not be aware of the migration. In an alternative embodiment, workload operating system 247 is aware of and cooperates in the migration.

Figure 3:
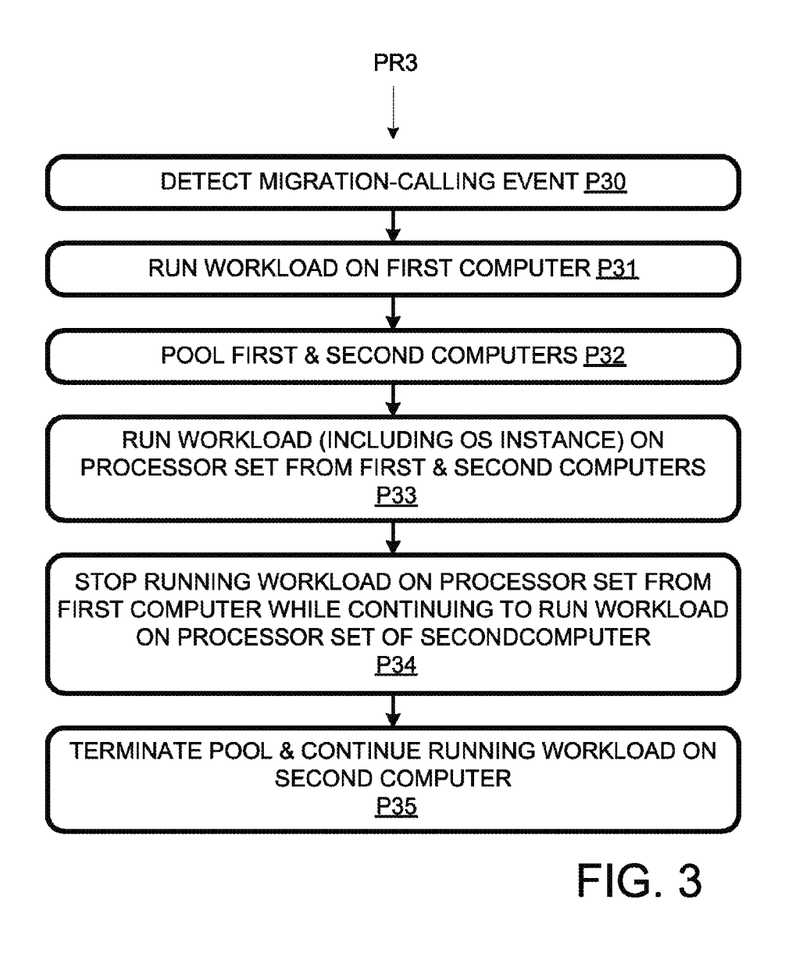
FIG. 3 is a more detailed flow chart of the process of FIG. 1.
Figure 4:
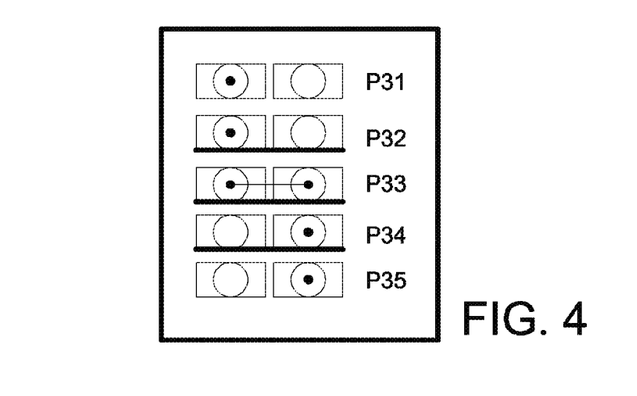
FIG. 4 is a flow diagram corresponding to the flow chart of FIG. 3.

Management operating system 241, pool manager 243, migration manager 245, and fabric 215 cooperate to implement process PR3, represented in FIGS. 3 and 4. In an alternative embodiment, workload operating system 247 also knowingly cooperates in the migration. At process segment P30, management operating system 241 responds to an event by requiring a migration of workload 100 from source computer 211 to target computer 212. The event can be a command from an administrator, or an automatically generated event, e.g., in response to detection of excessive error correction activity indicating an impending failure of computer 211.

At process segment P31, workload 100 is executing initially solely on source computer 211 as indicated near the top of FIG. 4 (which also depicts the results of process segments P32-P35). At process segment P32, management operating system 241, pool manager 243, and migration manager 245 cooperate to form pool 250 including computers 211 and 212. In an alternative embodiment, pool manager 243 commands workload operating system 247 to form the pool. At process segment P33, operating system 247 migrates some processes of workload 100 from source computer 211 to computer 212. For example, ongoing processes continue to run on source computer 211, while new processes are started on computer 212 so that workload 100 is in split mode (operating in a configuration split between computers 211 and 212). In some cases, one process can be executing on both computers 211 and 212 concurrently. Operating system 247 and fabric 215 are configured to provide for inter-computer inter-process communications between processes of workload 100 running on computers 211 and 212.

At process segment P34, all processes of workload 100 are running on target computer 212 so that workload 100 is effectively stopped on source computer 211. This stopping can occur as a result of moving all applications that were executing on computer 211 to target computer 212; once all processes that were running on source computer 211 when migration began expire, computer 211 can be released to the underlying firmware. Once workload 100 is stopped on source computer 211, pool 250 can be terminated at process segment P35. At this point, workload 100 can continue to run exclusively on target computer 212.

In a variation of process PR3, computer 212 and its processor set 112 are intermediate migration points for workload 100 (rather than the migration targets). In that variant, process segments P32-P35 can be iterated to migrate workload 100 to further intermediate computers and eventually to the target computer specified at process segment P30.

Operating system 247 can start and stop individual processors while workloads are running. This is shown with respect to process PR5, flow charted in FIG. 5, which makes it possible to limit power consumption during migration. Also, in cases where licenses fee are tied to the number of processors on which a workload is run, the licensing fees can be limited.

Figure 5:
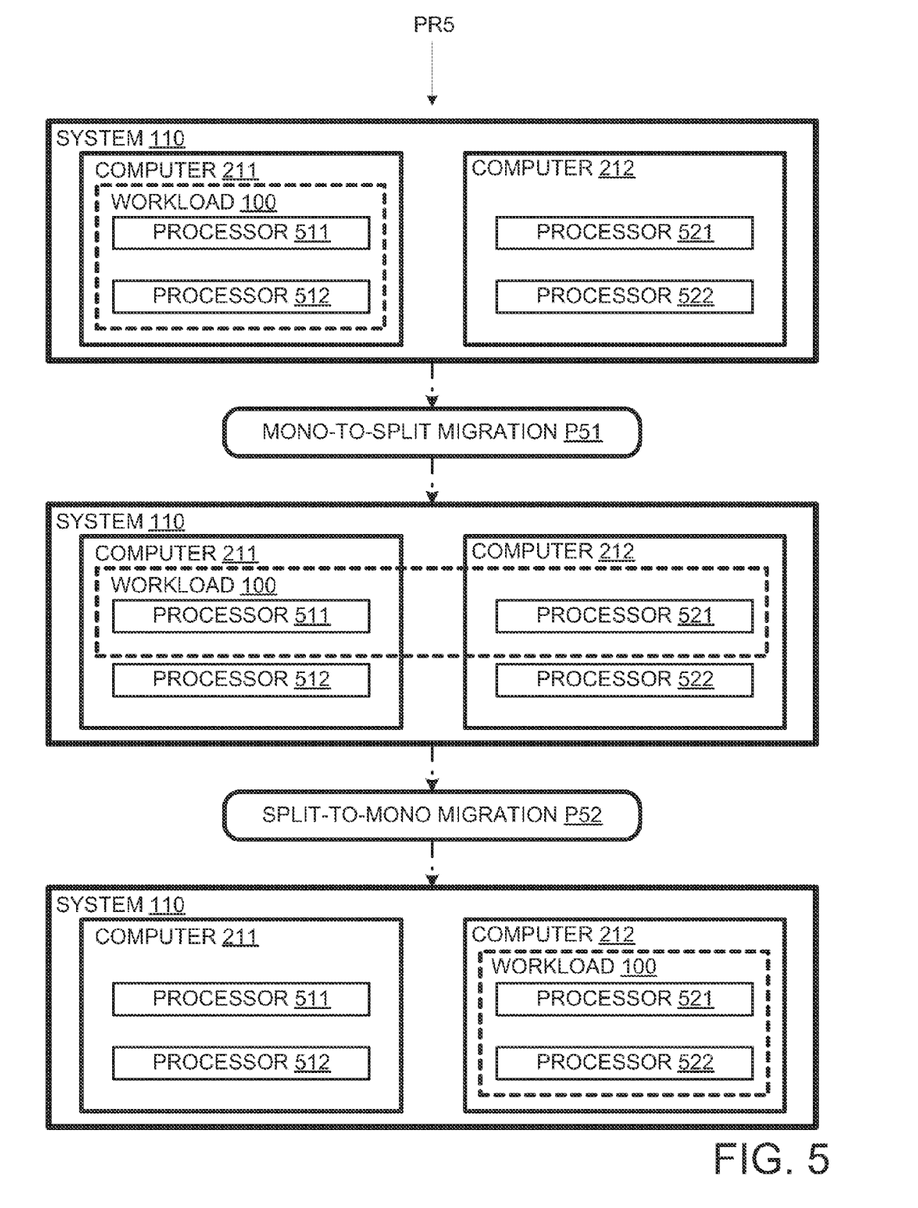
FIG. 5 is a flow diagram of a variant of the process of FIG. 1.

Initially, workload 100 is running on processors 511 and 512 of source computer 211. After mono-to-split process segment P51, workload 100 is running on processor 511 of source computer 211 and processor 521 of target computer 212. At this point, processor 512 of source computer 211 can be released to firmware to be power off or released for control by another operating system. After split-to-mono processor segment P52, workload 100 is running exclusively on processors 521 and 522 of target computer 212. At this point, processor 511 of target computer 511 can be released to firmware for use and powered off or made available to another operating system.

Figure 6:
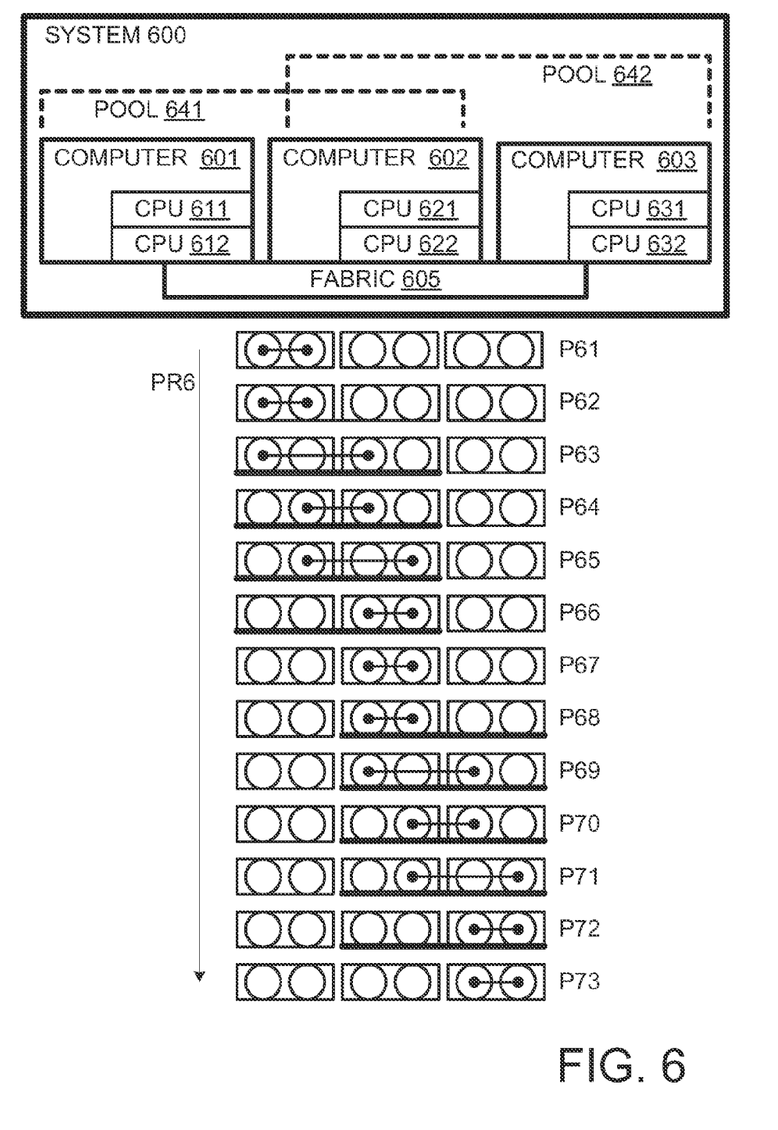
FIG. 6 is a flow diagram of another variant of the process of FIG. 1.

A migration process PR6, represented in FIG. 6, can involve more than two computers (and thus two processor sets). For example, system 600, shown in FIG. 6, includes computers 601, 602, and 603. These computers are connected by fabric 605 in series so that it is not possible to migrate directly from computer 601 to computer 603. Instead, workload 100 must migrate from computer 601 to computer 602 and then from computer 602 to computer 603.

At process segment P61, workload 100 is running on processors (CPUs) 611 and 612 of source computer 601. At process segment P62, fabric 605 is reconfigured to form a pool 641 including source computer 601 and intermediate computer 602. At process segment P63, processes begin migrating to processor 621 of intermediate computer 602, allowing processes on processor 611 to lapse. Some processes can be executing exclusively on computer 601, some process can be executing on computer 602 and some processes may be executing on both computer 601 and computer 602. At process segment P64, processor 611 can be stopped or released for use by another workload operating system. At process segment P65, processes start to be allocated to intermediate processor 622 in favor of source processor 612; new processes can continue to be allocated to intermediate processor 621. Note that process segments P63, P64, and P65 involve workload 100 in a split configuration and operating system 247 operating in split mode.

Process segment P66 involves allowing a final process to lapse on processor 612, which is then stopped or released. At process segment P67, pool 641 is terminated. At this point, workload 100 is in a mono configuration and operating system 247 is operating in so mono mode. In other words, workload 100 is only run on processors 621 and 622 of intermediate computer 602.

Process segments P68-P73 are analogous to process segment P61-P67. Process segment P68 involves forming a pool 642 including intermediate computer 602 and target computer 603. Process segment P69 operating system 247 assigning processes of workload 100 to target processor 631. Process segment P70 involves allowing processes to lapse on intermediate processor 621 and stopping processor 621 or releasing it for use by another operating system. Process segment P71 involves assigning processes to target process 632 and allowing processes on intermediate processor 622 to lapse. Process segment P72 involves stopping processor 622 once all processes on it (associated with workload 100) have lapsed. Process segment P73 involves terminating pool 642.

In process PR6, migration proceeds "amoeba style" by expanding first and then deleting. Thus, the number (e.g., three) of processors used at any one time does not exceed the steady state number (e.g., two) of processors by more than one. This approach can minimize costs associated with migration—either in terms of maximum resources used or charged under a license scheme. Note that there may be an order to the processor units within a processor set or computer, so that migration occurs within the computer or processor set as well as between computers and processor sets.

In a variant to process PR6, there is no point at which workload 100 runs exclusively on intermediate computer 602. Instead, sequence is: 1) workload runs solely on computer 601, 2) workload runs on computers 601 and 602, 3) workload runs on computers 601-603, 4) workload runs on computers 602 and 603, 5) workload solely on computer 603.

Alternatively, migration can proceed by deleting first and then adding. For example, in FIG. 6, processor 611 can be stopped before processor 621 is added. In this case, the number of processors oscillates between the steady state number (two) and one less than that (one). In this case, there may be no additional charges or resources costs involved in migration. Other variants provide for adding and deleting more than one processor at a time.

Migration can employ computer pooling or processor pooling; both types of pooling are best served by fast inter-computer communications. Computer pooling involves treating two or more computers as one. Thus, all processors of the pooled computers are pooled; if multiple operating systems are supported, the resulting pool can be divided among workloads in a variety of ways. Processor pooling involves treating a group of processors including processors from different computers as if they belonged to the same computer. Each computer involved in the processor pooling may also have processors not involved in the pooling; if multiple operating systems are supported only the operating system(s) running on a respective processor pool operates in split mode.

Herein, a "computer" is an at least predominantly hardware entity including 1) non-transitory tangible computer-readable storage media encodable with computer-executable instructions and computer-readable data, 2) a processor set of one or more hardware processing units for executing the instructions, and 3) hardware communications devices (e.g., network interfaces and input/output device interfaces).

Herein, computers are "distinct"—they are contained respectively within non-overlapping spatial volumes and if one can be shut down (aka, power off) and removed while the rest remain active. Typically, computers in different enclosures are distinct; however, hard partitions in the same disclosure can also be distinct. In some cases, hard partitions of a computer or blades of a blade system can be distinct. However, a computer nested within another computer (as a hard partition of a computer or a blade of a blade system) is not distinct from the incorporating computer. Virtual machines are not computers under the terminology used herein.

Herein, a "processor unit" is defined relative to an operating system or migration agent and denotes the minimum processor entity that can be deleted or added to the workload processor set on which a workload is executing. That unit may be, for example, a processor core or a processor "socket" (including all processor cores associated with a processor socket).

Herein, a "number of processors units" refers to a number of units that can be added individually by the operating system involved. If the operating system can add cores of a socket individually, then the number of processor units is the number of cores. If the operating system can only added processors one socket at a time, then the number of processor units is the number of sockets. The number of processors on which the workload runs on the source computer can be different from the number of processors on which the workload runs on the target computer. The difference can be used to maintain a constant performance level despite differences in the capabilities of the source and target processors. Also, the difference can be part of an intended reallocation plan to increase or decrease the level of performance available for the workload.

Unless otherwise indicated, a "processor set" is a fixed set of processor units. As used herein, a "source processor set", a "target processor set", a "second processor set", and an "intermediate processor set" are all fixed sets. On the other hand, a "workload processor sets" refers to the set of processor on which a workload is running; the contents of a workload processor set changes during a migration.

Herein, a "workload" includes an operating system and any programs (including guest operating systems) running on that operating system. Herein, an operating system executing on a single fixed processor set is operating in "mono mode", while the workload including that operating system is said to be in a "mono configuration". An operating system executing on mutually exclusive fixed processor sets, e.g., from distinct computers, is said to be operating in "split mode"; in such a case, the incorporating workload is said to be in "split configuration".

Herein, "amoeba-style" refers to a method of incremental migration in which processors are iteratively added and deleted (or deleted and added) to the set of processors on which the workload being migrated is run. The term "amoeba style" is based on the motion of a biological amoeba which moves by expanding and contracting in the direction of movement.

Herein, a "system" is a set of interacting elements, wherein the elements can be, by way of example and not of limitation, mechanical components, electrical elements, atoms, instructions encoded in storage media, and process segments. Herein, "computer-readable storage media" encompasses non-transitory tangible media and does not denote communications media such as signals. Herein, "processor" refers to a tangible material device for executing physical encodings of computer instructions. In this specification, related art is discussed for expository purposes. Related art labeled "prior art", if any, is admitted prior art. Related art not labeled "prior art" is not admitted prior art. The illustrated and other described embodiments, as well as modifications thereto and variations thereupon are within the scope of the following claims.

What is claimed is:
1. A computer-implemented method comprising:
   detecting an event calling for a migration of a computer workload including an operating system image from a source processor set to a target processor set;
   in response to said detecting, reconfiguring a fabric so as to pool said source processor set with a second processor set, said source processor set and second processor set being included in respective distinct computers;
   first allocating processes of said workload so that some of said processes are executed on said source processor set and, concurrently, some are executed on said second processor set so that said operating system image is across said source processor and said second processor sets; and then
   second allocating processes of said workload so that no process of said workload is executing on said source processor set and at least some of said processes are executing on said second processor set, said second processor set being said target processor set or being an intermediate processor set from which said workload is migrated to said target processor set, said source processor set and said target processor set being included in respective distinct computers.

2. A method as recited in claim 1 further comprising executing all active processes of said workload on said target processor set, said workload continuously executing from a time of said detecting to a time said all active processes of said workload are executing on said target processor sets, the pooling allowing full coherent access to memory across said source and second processor sets.

3. A method as recited in claim 2 further comprising, after said second allocating, shutting down said source processor set while executing said workload.

4. A method as recited in claim 1 further comprising allocating said processes to said target processor set while none of said processes are running on said source processor set.

5. A method as recited in claim 1 wherein said first and second allocating involve alternately adding and deleting processors to a workload processor set of processors on which said workload is executing so that the maximum number of processors in said workload processor set is at most one greater than the maximum number of processors in said source processor set and said target processor set, said target processor set including plural processors.

6. A system comprising:
   hardware said hardware including a fabric, computer-readable storage media, a source processor set, and a target processor set;
   a computer workload encoded on said media, said computer workload including an operating system image; and
   a management system to perform the actions of,
      detecting an event indicating that said workload is to be migrated from said source processor set to said target processor set, said source processor set and said target processor set being included in respective distinct computers;
      in response to detecting said event, reconfiguring said fabric so as to pool said source processor set with a second processor set, said source processor set and said second processor set being included in respective distinct computers;
      allocating processes of said workload to said second processor set so that some of said processes are executing on said source processor set while, concurrently, others of said processes are executing on said second processor set so that said operating system image is across said source processor and said second processor sets, and
      allocating processes of said workload to said second processor set so that none of said processes are executing on said source processor set, said second processor set being said target processor set or being an intermediate processor set from which said workload is migrated to said target processor set.

7. A system as recited in claim 6 further comprising source and target computers, said source computer containing said source processor set, said target computer containing said target processor set, said target computer being distinct from said source computer, the pooling allowing full coherent access to memory across said source processor and said second processor sets.

8. A system as recited in claim 7 wherein said media includes shared media shared by said source processor set and target processor set, said workload being encoded on said shared media.

9. A system as recited in claim 7 wherein said operating system image is further to migrate said workload from said source computer to said target computer amoeba style.

10. A computer product comprising computer-readable storage media encoded with code defining a computer workload and management software, said management software being to, when executed by hardware, perform the following actions,
    detecting an event indicating that said workload is to be migrated from a source processor set to a target processor set, said source processor set and said target processor set being included in respective distinct computers;
    in response to detecting said event, reconfiguring a fabric so as to pool said source processor set with a second processor set, said source processor set and said second processor set being included in respective distinct computers;
    allocating processes of said workload to said second processor set so that some processes of said workload are executing on said source processor set and, concurrently, some processes of said workload are executing on said second processor set so that said operating system image is across said source processor and said second processor sets; and
    allocating at least some of said processes to said second processor set so that none of said processes of said workload are executing on said source processor set, said second processor set being said target processor set or being an intermediate processor set from which said workload is migrated to said target processor set.

11. A computer product as recited in claim 10 wherein said management software is to form and terminate a processor pool between said source processor set and said second processor set, the pool allowing full coherent access to memory across processor units of said source and second processor sets.

12. A computer product as recited in claim 11 wherein said management software is configured to,
    in response to detecting said event, form a pool between at least one processor of said source processor set and at least one processor of said second processor set, and
    terminate said pool once no process of said workload is running on said source processor set.

13. A computer product as recited in claim 10 wherein said management software is configured to migrate said workload amoeba-style from said source processor set to said target processor set.

14. A computer product as recited in claim 10 wherein said second processor set is said target processor set.

* * * * *